Jan. 7, 1958 A. D. WILEY ET AL 2,819,379
DOUBLE PASS WELDING OF SPIRAL PIPE
Filed March 7, 1952
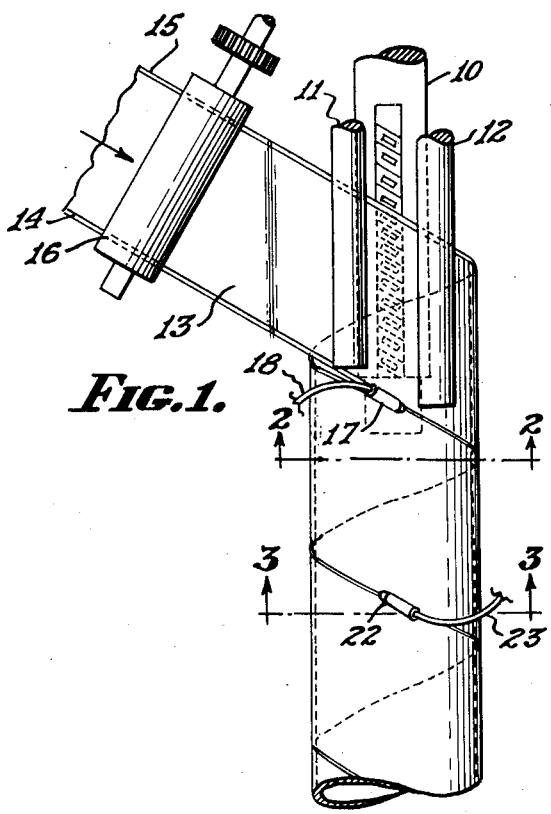
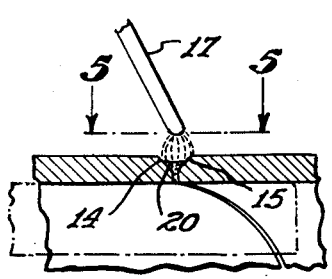
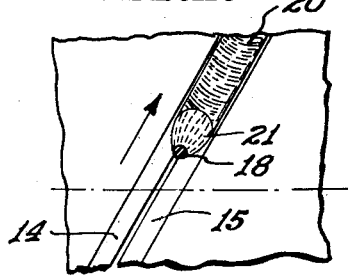
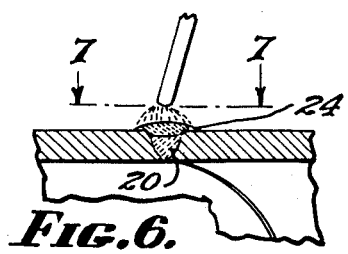
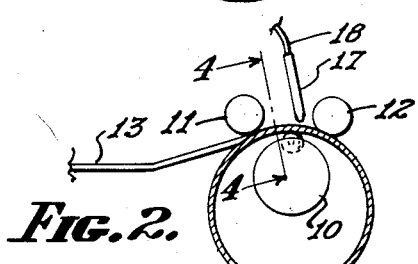
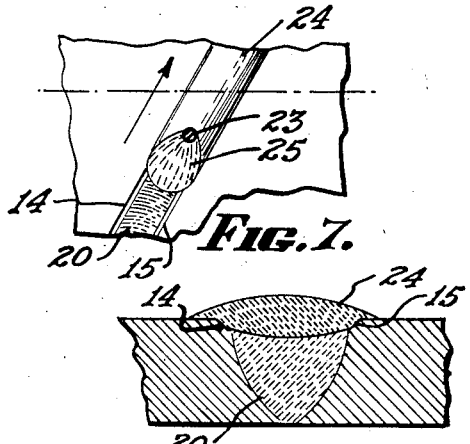
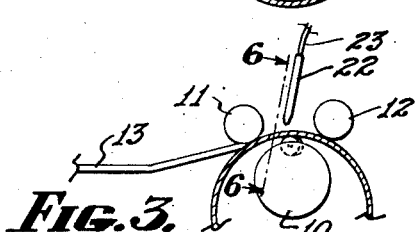
INVENTORS.
ALLEN DALE WILEY
AND FOREST C. BOWMAN,
BY
ATTORNEYS.

United States Patent Office 2,819,379
Patented Jan. 7, 1958

2,819,379

DOUBLE PASS WELDING OF SPIRAL PIPE

Allen Dale Wiley and Forest C. Bowman, Middletown, Ohio, assignors to Armco Steel Corporation, Middletown, Ohio, a corporation of Ohio Application March 7, 1952, Serial No. 275,294

10 Claims. (Cl. 219—62)

This invention relates to the double pass welding of spiral pipe. Spiral welded pipe is now generally made by forming metallic strip into a helix and welding the adjacent edges of the strip after a convolution has been made. The strip is fed at an angle over a mandrel or the like and a forming mechanism forms the strip into a helix. The strip is fed continuously and the formed pipe passes off the mandrel at an angle to the direction of the incoming strip.

This type of pipe has been very successful commercially; nevertheless we are interested in constant improvement.

Generally, the strip is formed by being bent downwardly and around so that the incoming strip comes in at the top of the formed pipe, and the weld is generally made at the top of the pipe. In order to produce a weld of the best possible character from the standpoint of having a minimum of checking, it is necessary to weld in a zone of minimum stresses. If a vertical axial plane through the pipe be imagined, the region of minimum stresses is somewhat beyond said vertical plane in terms of the direction of feed of the incoming strip, and the direction of rotation of the pipe. It is, therefore, desirable from the standpoint of minimum checking, to produce the weld beyond this vertical plane.

If, however, a weld is produced at that point it will have a poor appearance because of the fact that the molten metal from the pool will tend to run down the rear side of the pipe in the direction in which the pipe is traveling, and the weld will have an unsatisfactory appearance.

If it is desired to produce a weld having the optimum appearance then we have found that better results are obtained if the weld is performed ahead of the imaginary vertical plane mentioned above; but if the weld is formed ahead of said plane it will not be formed in the region of minimum stresses, and it will suffer from checking.

With the foregoing difficulties in mind it is an object of our present invention to provide a method of making spiral welded pipe in which the weld will have optimum quality and freedom from checking, and wherein the weld will also have the optimum appearance.

It is a further object of our invention to provide a method of welding spiral pipe wherein a complete weld is produced by two passes wherein the first pass is performed in such a manner as to obtain maximum quality and freedom from checking, and wherein the second pass is performed in order to obtain optimum appearance.

It is yet another object of our invention to provide a method as above outlined wherein the weld formed in the first pass is only a partial weld of the edges, and to perform a second weld wherein the weld is completed.

Generally speaking, our objects include the provision of better spiral welded pipe having a more perfect weld with the concomitant results of less scrap and less repair jobs, as well as meeting the ever advancing standards.

These and other objects of our invention, which we shall point out in more detail as we proceed with this description, or which will be apparent to one skilled in the art upon reading these specifications, we accomplish by that series of method steps of which we shall now describe an exemplary embodiment.

Reference is made to the drawing forming a part hereof, and in which:

Figure 1 is a fragmentary plan view of a forming apparatus showing a strip of metal being formed into a helix;

Figure 2 is a cross sectional view taken on the line 2—2 of Figure 1 and showing the first pass set-up;

Figure 3 is a fragmentary view similar to Figure 2 and taken on the line 3—3 of Figure 1 and showing the second pass set-up;

Figure 4 is a fragmentary cross sectional view on an enlarged scale taken on the line 4—4 of Figure 2;

Figure 5 is a fragmentary plan view as taken on the line 5—5 of Figure 4;

Figure 6 is a cross sectional view on an enlarged scale taken on the line 6—6 of Figure 3;

Figure 7 is a plan view taken on the line 7—7 of Figure 6; and

Figure 8 is a cross sectional view similar to Figure 6 on a still further enlarged scale showing the completed weld.

Briefly, in the practice of our invention we form a metallic strip into a helix. This may be accomplished by means of a machine, such as is disclosed in the co-pending applications in the name of Jonathan Roy Freeze, Serial Nos. 8,758, filed February 17, 1948, now Reissue Patent No. 23,316, dated January 2, 1951; 101,883, filed June 28, 1949; 225,715, filed May 11, 1951, now Patent No. 2,729,180, dated January 3, 1956; and 225,716, filed May 11, 1951, now Patent No. 2,752,873, dated July 3, 1956. We perform our first pass at a point slightly beyond an imaginary vertical axial plane through the pipe in terms of the direction of feed of the strip; and we perform our second pass at a point slightly ahead of the same vertical axial plane one or more convolutions later. With the first pass we unite the edges of the strip by full depth fusion, which forms an incomplete weld having a concave upper surface; with the second pass we fill up the weld and form a low wide bead.

Referring now in more detail to the drawing, a forming mandrel is shown at 10, and forming elements are shown at 11 and 12. These may be as described in the Freeze application mentioned above. The metallic strip is indicated at 13, and it is fed into the machine at an angle to the mandrel depending upon the diameter of pipe to be formed and the width of the spring. The edges of this strip are beveled at a 45° angle at 14, and 15. A feed roll is indicated at 16. The first welding set-up includes a nozzle for feeding a welding rod. The nozzle is indicated at 17, and the welding rod at 18. It will be observed that the nozzle 17 and the welding rod as it approaches the point of weld, is in a vertical plane including the edge 14 of the incoming strip. It is, however disposed at an angle to the vertical in the vertical plane of about 10° as best seen in Figure 2. It will also be observed from Figures 1 and 2 that the tip of the weld rod is disposed slightly beyond the vertical axial plane.

The distance beyond the vertical plane at which the first weld is performed may vary from about 1/8" to 5/8" measured circumferentially of the pipe. The exact distance can readily be determined by experimentation, but there are various considerations that assist in the determination.

Thus, with a given gauge of strip material, if it is desired to make pipe of a certain diameter, a certain strip width and a certain forming angle are employed. Either the forming angle or the strip width can be varied with limits to produce pipes of different diameter. However, as the forming angle gets to a point where it is about 35°, the pipe becomes somewhat flimsy, and the speed of feed must be reduced. This 35° angle will be found to prevail, for example with pipe of 141 gauge. Regardless of the gauge the machine feed must be reduced when the forming angle attains about 35°, but with heavier gauges, as for example 250 gauge, the feed does not have to be reduced as much as with lighter gauges because the pipe will not be as flimsy. As the feed is reduced the distance beyond the imaginary vertical plane can be increased toward the ⅝″ figure. With faster speeds the distance must be reduced toward the ⅛″ figure.

The type of material from which the pipe is being made also has an effect on the speed at which the machine can be operated. Thus, for example on high carbon steel the machine must be run more slowly, and since it is run more slowly the weld may be performed at a distance up to ⅝″ beyond the imaginary vertical plane.

Since the first bead does not have to complete the joint between the two edges, attention may be given to securing a good inside surface without regard to whether the space between the edges of the sheet is filled up. Thus, the first bead may be backed up from within the pipe, and since a great deal of weld metal is not being added, difficulties with the backing shoe will not be encountered to the extent which generally occurred. As seen in Figure 4 the weld produced by the first welding set-up will produce a bead which is concave and which joins the beveled edges of the strip in a feather edge. Fusion is obtained all the way through and the inside of the seam may be made very smooth by proper backing shoe application. The bead produced by the first pass is indicated at 20.

From a consideration of Figure 5 the effect of the 10° tilt of the electrode will be observed. The tip of the electrode is indicated at 18, and the molten pool produced by the electrode by virtue of the 10° angle is indicated at 21 where it will be seen to be of a sort of fan shape. This permits the metal in the space between the abutting edges of the strip to assume the smooth concave configuration with the feather edge blending of the bead with the bevel on the strip edges.

The second bead is produced by a second welding nozzle indicated at 22 through which is fed an electrode or welding rod 23. It will again be observed that the nozzle 22 is in a plane parallel to the first mentioned plane, including the strip edge 14, and again it is disposed at an angle of about 10° to the vertical except that the weld rod 23 is fed downwardly and rearwardly, while the weld rod 18 is fed downwardly and forwardly. It will also be observed that the tip of the welding rod is ahead of the imaginary vertical axial plane through the pipe.

As best seen in Figure 7 the bead produced by the second pass, and indicated at 24, will be a shallow wide bead extending beyond the ends of the bevel and it will have the effect of normalizing the dendritic structure of the bead 20. The effect of the 10° angle of feed of the welding electrode is best observed in Figure 7 where the end of the electrode may be seen at 23. The pool of molten metal 25, because of the angle of electrode feed will be fan shaped in a rearward direction with regard to the direction of rotation of the pipe. This assists in producing the wide shallow bead 24. The distance ahead of the vertical axial plane at which the second pass is made may vary from about ½″ to about 2″ measured circumferentially of the pipe. Again the exact distance will depend upon the diameter of pipe, the feed, and the forming angle. Generally speaking the larger pipe diameter, the faster the feed and the greater the forming angle, the farther toward the 2″ distance the weld may be produced. With smaller diameter pipe slower feeds and smaller forming angles the distance ahead of the vertical axial plane must be reduced toward the ½″ end of the range. As will be clear the second bead 24 will fill up and complete the weld and provide a good appearance and shape, as well as refining the structure of the first bead by an annealing effect. The ideal bead at 24 is flat and having a controlled amount of metal above the surface of the pipe. While in our drawings we have shown the bead 24 produced at the succeeding convolution at the top of the pipe, it will be understood that the second bead may be produced any desired number of pitches after the first bead.

It will also be noted that since the second bead is performed as a second pass over a first bead, there will be no need for backing up the second weld. The first weld in effect backs up the second weld.

The provision of a weld as herein disclosed renders spiral welded pipe still more commercially desirable, in that if the pipe is to be coated with a bituminous material for protection against electrolysis, the load on the bead is less likely to cause wear through the bituminous coating. Furthermore, in the field banding of spiral welded pipe, the low bead does not interfere with banding as was the case with the previously known high bead. Pipe having the two pass weld disclosed herein satisfies a great commercial demand, and at the same time produces a better welded structure so that less scrap is encountered and we are better able to meet the ever advancing standards.

It will be understood that numerous modifications may be made without departing from the spirit of our invention. It will also be understood that the 10° angle of electrode feed is not too critical. We have found that 10° is about a correct angle, but slightly smaller and slightly larger angles may be used. As the 10° angle is increased, penetration decreases; and as the 10° angle is reduced, the breadth decreases and penetration increases. From our experience we have found the 10° angle to be the optimum angle.

In view of the factors mentioned above we do not intend to limit ourselves in the claims which follow other than as required by the prior art.

Having now fully described our invention what we claim as new and desire to secure by Letters Patent, is:

1. The method of making spiral butt-welded pipe from metallic strip, which includes the steps of free-forming said strip into a helix with an edge of the incoming strip meeting an edge of the first convolution at the top of the formed pipe, forming a first butt-weld of said edges at the top of said pipe slightly beyond a vertical axial plane through said pipe, and forming a second weld over said first weld at the top of said pipe slightly ahead of the point where said first weld crosses said plane at a succeeding convolution.

2. The method of claim 1 wherein said first weld is formed from about ⅛″ to about ⅝″ beyond said plane, measured circumferentially of said pipe.

3. The method of claim 1 wherein said second weld is formed from about ½″ to about 2″ ahead of said plane, measured circumferentially of said pipe.

4. The method of claim 1, wherein said first weld is formed from about ⅛″ to about ⅝″ beyond said plane, and said second weld is formed from about ½″ to about 2″ ahead of said plane, both measured circumferentially of said pipe.

5. The method of claim 1, wherein said first weld is formed by feeding a weld rod downwardly and forwardly in a vertical plane including said edge of the incoming strip, and at an angle of about 10° to the vertical.

6. The method of claim 1, wherein said second weld is formed by feeding a weld rod downwardly and rearwardly in a vertical plane parallel to said edge of the incoming strip, and at an angle of about 10° to the vertical.

7. The method of claim 1, wherein said first weld is formed by feeding a weld rod downwardly and forwardly in a vertical plane including said edge of the incoming strip and at an angle of about 10° to the vertical, and said second weld is formed by feeding a weld rod downwardly and rearwardly in a vertical plane parallel to said last mentioned plane, and at an angle of about 10° to the vertical.

8. The method of claim 1, wherein said first weld is formed by feeding a weld rod downwardly and forwardly in a vertical plane including said edge of the incoming strip, and at an angle of about 10° to the vertical, and with its tip from about 1/8" to about 5/8" beyond said axial plane, measured circumferentially of said pipe.

9. The method of claim 1, wherein said second weld is formed by feeding a weld rod downwardly and rearwardly in a vertical plane parallel to said edge of the incoming strip, and at an angle of about 10° to the vertical, and with its tip from about 1/2" to about 2" ahead of said axial plane, measured circumferentially of said pipe.

10. The method of claim 1, wherein said first weld is formed by feeding a weld rod downwardly and forwardly in a vertical plane including said edge of the incoming strip and at an angle of about 10° to the vertical, and with its tip from about 1/8" to about 5/8" beyond said axial plane, measured circumferentially of said pipe, and wherein said second weld is formed by feeding a weld rod downwardly and rearwardly in a vertical plane parallel to said edge of the incoming strip, and at an angle of about 10° to the vertical, and with its tip from about 1/2" to about 2" ahead of said axial plane, measured circumferentially of said pipe.

References Cited in the file of this patent

UNITED STATES PATENTS

| | | |
|---|---|---|
| 375,435 | Alden | Dec. 27, 1887 |
| 1,523,927 | Beebe | Jan. 20, 1925 |
| 1,793,280 | Williams | Feb. 17, 1931 |
| 1,915,029 | Naylor | June 20, 1933 |
| 2,282,032 | Catlett | May 5, 1942 |
| 2,490,024 | Bernard | Dec. 6, 1949 |